(12) United States Patent
Li et al.

(10) Patent No.: US 11,914,887 B2
(45) Date of Patent: Feb. 27, 2024

(54) STORAGE DEVICE AND DATA ACCESSING METHOD USING MULTI-LEVEL CELL

(71) Applicant: MACRONIX INTERNATIONAL CO., LTD., Hsinchu (TW)

(72) Inventors: Yung-Chun Li, New Taipei (TW); Han-Wen Hu, Tainan (TW); Bo-Rong Lin, Taichung (TW); Huai-Mu Wang, New Taipei (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 164 days.

(21) Appl. No.: 17/403,927

(22) Filed: Aug. 17, 2021

(65) Prior Publication Data
US 2022/0334757 A1    Oct. 20, 2022

Related U.S. Application Data

(60) Provisional application No. 63/174,547, filed on Apr. 14, 2021.

(51) Int. Cl.
*G06F 3/06* (2006.01)
*G06F 11/10* (2006.01)
*G06F 12/02* (2006.01)

(52) U.S. Cl.
CPC .......... *G06F 3/0655* (2013.01); *G06F 3/0619* (2013.01); *G06F 3/0679* (2013.01); *G06F 11/1072* (2013.01); *G06F 12/0246* (2013.01)

(58) Field of Classification Search
CPC .... G06F 3/0655; G06F 3/0619; G06F 3/0679; G06F 3/0638; G06F 3/0653; G06F 3/0673; G06F 11/1072; G06F 11/106; G06F 2207/4824; G06F 7/5443; G06F 7/496; G06F 7/50; G06F 7/523; G06F 9/30018; G06F 9/30029; G11C 11/5628; G11C 11/56; G11C 11/5642; G11C 16/26; G11C 16/10; G11C 16/0483; G11C 16/3418; G11C 16/3431; G11C 29/52; G11C 2211/5644
See application file for complete search history.

(56) References Cited

U.S. PATENT DOCUMENTS

| | | | |
|---|---|---|---|
| 2011/0126080 A1* | 5/2011 | Wan ..................... | G11C 11/5642 714/763 |
| 2013/0055046 A1* | 2/2013 | Blodgett ............. | G06F 11/0793 714/764 |
| 2018/0074896 A1* | 3/2018 | Takada ................ | G11C 16/3459 |

(Continued)

*Primary Examiner* — Curtis James Kortman
(74) *Attorney, Agent, or Firm* — McClure, Qualey & Rodack, LLP

(57) ABSTRACT

A storage device and a data accessing method are disclosed, wherein the storage device includes a memory circuit and a control circuit. The memory circuit includes a plurality of multi-level cells, and each of the multi-level cells is configured to store at least a first bit, a second bit and a third bit in at least a first page, a second page and a third page. The control circuit is configured to read the first bits according to a one-time reading operation related to the first bits, read the second bits according to M-times reading operations related to the second bits, and read the third bits according to N-times reading operations related to the third bits, wherein the difference between M and N is less than or equal to one.

16 Claims, 14 Drawing Sheets

(56) References Cited

U.S. PATENT DOCUMENTS

| | | | |
|---|---|---|---|
| 2018/0076828 A1* | 3/2018 | Kanno | G11C 16/10 |
| 2020/0057561 A1* | 2/2020 | Lai | G06N 3/063 |
| 2021/0082497 A1* | 3/2021 | Hara | G11C 16/10 |
| 2022/0005535 A1* | 1/2022 | Kim | G11C 16/3427 |

* cited by examiner

US 11,914,887 B2

STORAGE DEVICE AND DATA ACCESSING METHOD USING MULTI-LEVEL CELL

This application claims the benefit of U.S. provisional application Ser. No. 63/174,547, filed Apr. 14, 2021, the subject matter of which is incorporated herein by reference.

TECHNICAL FIELD

The present disclosure relates to a storage device and a data accessing method, and particularly relates to a storage device and a data accessing method using multi-level cells.

BACKGROUND

As the progress of semiconductor technology, memory structures with multi-level cells (MLC) have been widely employed. Serving as storing units of the memory, each of the multi-level cells can store multi-bits data and hence storing capacity of the memory can be greatly enhanced.

However, due to characteristics of multi-bits of multi-level cells, when reading each bit of the multi-level cells, reading operations may be performed for several times (i.e., usually more than one time) so as to apply reading voltages of different voltage ranges. Given that more times of reading operations of multi-level cells are performed, error may more easily occur in data reading. Accordingly, if reading operations of the multi-level cells have to be performed by more times, error correction mechanism (e.g., encoding by an error correction code (ECC)) may be employed to correct data error. Nevertheless, if excessive times of reading operations are needed and hence more complicated ECC is employed, increased additional data (i.e., overhead) may be introduced by ECC encoding, which may lead to downgrading of data storing efficiency of the memory.

From the above, related industries in the technical field of the present disclosure may spend great efforts on minimizing operating times of reading operations of the multi-level cells, so that error correction mechanism for data stored in the multi-level cells may be simplified, and additional data introduced by the error correction mechanism may be therefore reduced.

SUMMARY

An embodiment of the present disclosure provides a storage device, and the storage device includes a memory circuit and a control circuit. The memory circuit includes a plurality of multi-level cells, and each of the multi-level cells is configured to store at least a first bit, a second bit and a third bit in at least a first page, a second page and a third page. The control circuit is configured to read the first bits according to a one-time reading operation related to the first bits, read the second bits according to M-times reading operations related to the second bits, and read the third bits according to N-times reading operations related to the third bits, wherein the difference between M and N is less than or equal to one.

Another embodiment of the present disclosure provides a data accessing method, being applied to a memory circuit comprising a plurality of multi-level cells, each of the multi-level cells is configured to store at least a first bit, a second bit and a third bit in at least a first page, a second page and a third page, the data accessing method comprising the following steps. Reading the first bits according to a one-time reading operation related to the first bits. Reading the second bits according to M-times reading operations related to the second bits. Reading the third bits according to N-times reading operations related to the third bits. The difference between M and N is less than or equal to 1.

Still another embodiment of the present disclosure provides a data updating method, being applied to a memory circuit storing a plurality of data, the data updating method comprising the following steps. Setting a first threshold value, the first threshold value being less than a maximum number of corrected bits of an error correction code. Checking whether the data stored in the memory circuit has at least one error bit, and calculating the number of the at least one error bit. Comparing the number of the at least one error bit with the first threshold value, if the number of the at least one error bit is greater than the first threshold value, reading the data from the memory circuit. Decoding the data by the error correction code to correct the at least one error bit. Writing the corrected data into the memory circuit.

Figure 1:
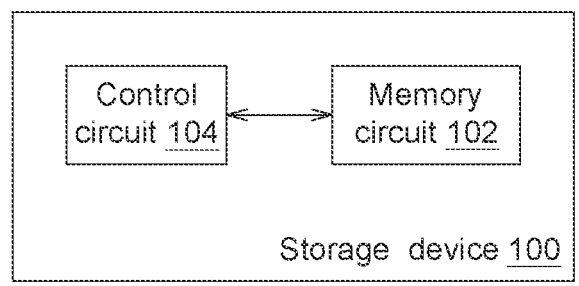
FIG. 1 is a block diagram of a storage device according to the first embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

FIG. 1 is a block diagram of a storage device 100 according to the first embodiment of the present disclosure. Referring to FIG. 1, the storage device 100 of the first embodiment includes a memory circuit 102 and a control circuit 104. The memory circuit 102 includes a plurality of multi-level cells, and each multi-level cell is configured to store at least a first bit B1, a second bit B2 and a third bit B3 in at least a first page, a second page and a third page respectively. The first page is a low page, the second page is a middle page, and the third page is a high page.

Furthermore, the control circuit 104 is configured to read the first bit B1 according to one-time reading operation related to the first bit B1 of the multi-level cells, and read the second bits B2 according to M-times reading operations related to the second bits B2, and read the third bits B3 according to N-times reading operations related to the third bits B3. The difference between M and N is less than or equal to 1. An unexpected result of the technical solution of the present disclosure is that, the times M of reading (i.e., the times M for performing reading operations) of the second bit B2 and the times N of reading (i.e., the times N for performing reading operations) of the third bit B3 are equally assigned, so that the times M of reading the second bit B2 and the times N of reading the third bit B3 are the same or close to each other. Therefore, its avoided that performing times of reading operations for a certain bit (or several bits) of the multi-level cells are excessive and hence result in an increased error rate for reading these bits.

In the first embodiment of the present disclosure, each of the multi-level cells is a triple-level cell (TLC), and each of the triple-level cells has three bits, including the first bit B1, the second bit B2 and the third bit B3. The first to third bits B1~B3 are respectively stored in the first to third pages, and are configured to store a three-bits data (b1 b2 b3)$_2$, and b1 is the binary logic value of the first bit B1, b2 Is the binary logic value of the second bit B2, and b3 is the binary logic value of the third bit B3. The triple-level cells storing different logic values of three-bits data (b1 b2 b3)$_2$ may have different threshold voltage distributions. For example, the triple-level cells storing three-bits data (0 0 0)$_2$ have a threshold voltage distribution Vt (0,0,0), the triple-level cells storing three-bits data (0 0 1)$_2$ have threshold voltage distribution Vt(0,0,1). The three-bits data of different logical values refer to (1 1 1)$_2$, (1 0 1)$_2$, (1 0 0)$_2$, (1 1 0)$_2$, (0 1 0)$_2$, (0 1 1)$_2$, (0 0 1)$_2$ or (0 0 0)$_2$, which respectively correspond to threshold voltage distributions Vt(1,1,1), Vt(1,0,1), Vt(1, 0,0), Vt(1,1,0), Vt(0,1,0), Vt(0,1,1), Vt(0,0,1), and Vt(0,0,0). The threshold voltage distributions Vt(1,1,1), Vt(1,0,1), Vt(1,0,0), Vt(1,1,0), Vt(0,1,0), Vt(0,1,1), Vt(0,0,1), and Vt(0,0,0) are arranged in and order from low voltage to high voltage.

More particularly, the memory circuit 102 may be various types of two-dimensional memory, such as, two-dimensional (2D) NAND flash memory, 2D phase change memory (2D PCM), 2D Resistive Random Access Memory (2D RRAM), or 2D Magneto-resistive Random Access Memory (2D MRAM). Furthermore, the memory circuit 102 can also be various types of three-dimensional (3D) memory, such as, 3D NAND flash memory, 3D PCM, 3D RRAM or 3D MRAM. The memory circuit 102 includes a plurality of multi-level cells (MLC), each multi-level cell has a plurality of bits, and the multi-level cell may be a 2D memory cell or a 3D memory cell.

On the other hand, the control circuit 104 is electrically connected to the memory circuit 102. The control circuit 104 is configured to perform reading operations to read the three-bits data (b1 b2 b3)$_2$ stored in the triple-level cells in the memory circuit 102. The control circuit 104 can apply reading voltages Vr of different voltage values according to the threshold voltage distributions of the triple-level cells to read the first bit B1, the second bit B2 and the third bit B3 of the triple-level cell respectively. The detailed descriptions for the storage device 100 and the multi-level cells are provided in the following paragraphs.

Figure 2A:
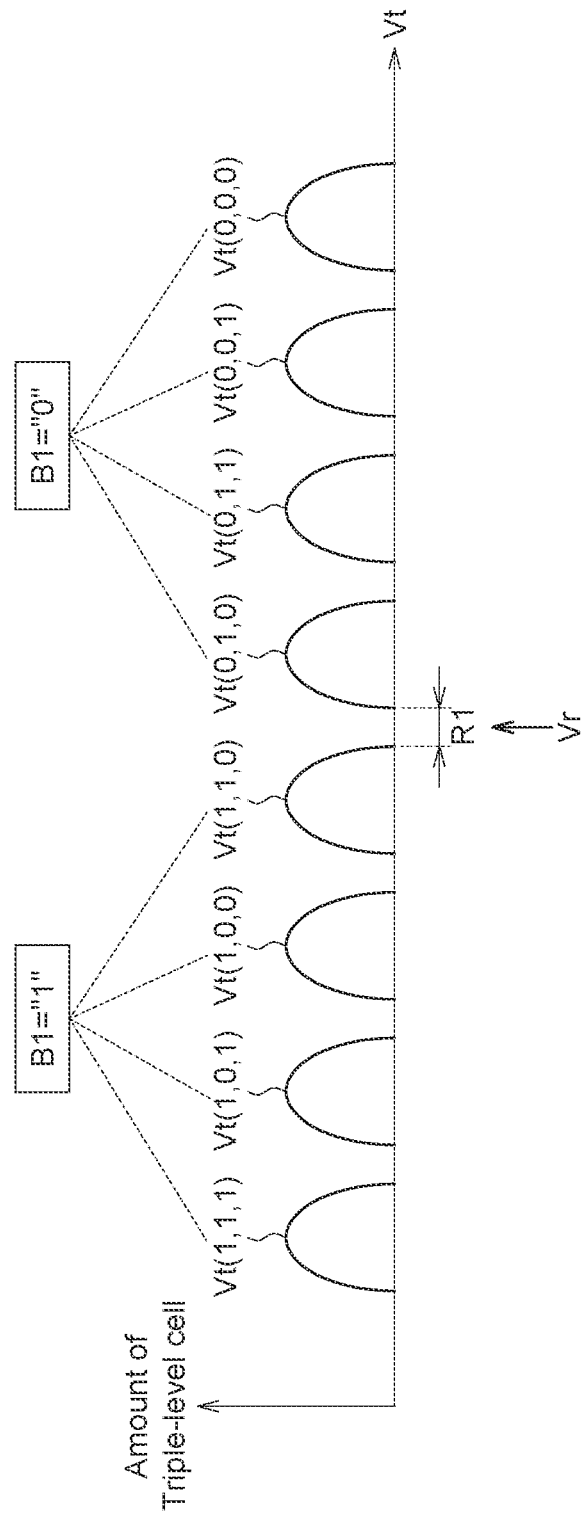
FIGS. 2A to 2C are schematic diagrams of the threshold voltage distributions and the reading voltage of the triple-level cells of the present disclosure.
Figure 2B:
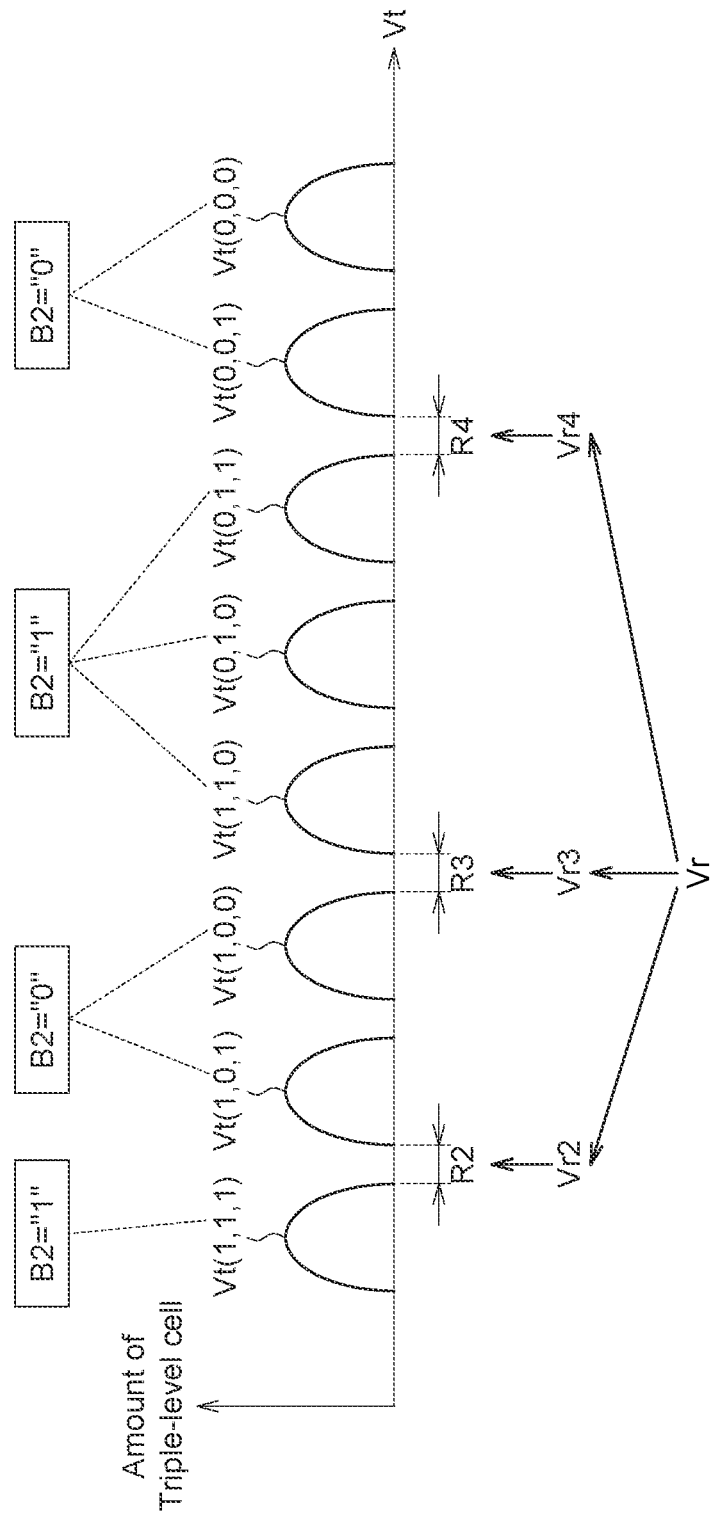
Figure 2C:
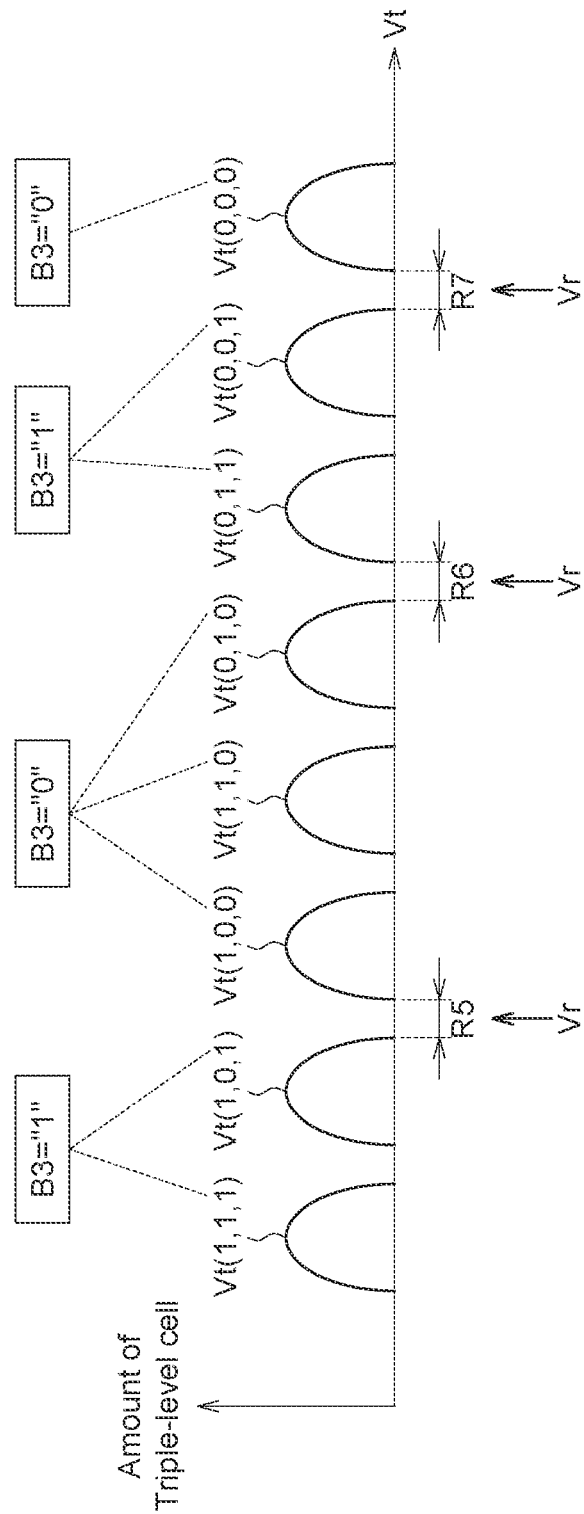

FIGS. 2A to 2C are schematic diagrams of the threshold voltage distributions and the reading voltage Vr of the triple-level cells of the present disclosure. First, referring to FIG. 2A, triple-level cells in the memory circuit 102 may store different logic values of three-bits data as (1 1 1)$_2$, (1 0 1)$_2$, (1 0 0)$_2$, (1 1 0)$_2$, (0 1 0)$_2$, (0 1 1)$_2$, (0 0 1)$_2$ and (0 0 0)$_2$ respectively corresponding to threshold voltage distributions Vt(1,1,1), Vt(1,0,1), Vt(1,0,0), Vt(1,1,0), Vt(0,1,0), Vt(0,1,1), Vt(0,0,1) and Vt(0,0,0) (which are arranged in an order from low voltage to high voltage).

As shown in FIG. 2A, a voltage range R1 is between the threshold voltage distributions Vt(1,1,0) and Vt(0,1,0). When the reading voltage Vr applied by the control circuit 104 to the triple-level cells is set to be within the voltage range R1, triple-level cells with threshold voltage distributions Vt(1,1,1), Vt(1,0,1), Vt(1, 0,0) or Vt(1,1,0) may have threshold voltages Vt less than the reading voltage Vr, hence such triple-level cells with threshold voltage distributions Vt(1,1,1), Vt(1,0,1)), Vt(1,0,0) or Vt(1,1,0) can be turned on, and logic values stored in the memory cells can be read out by other circuits (such as sensing amplifiers). These turned-on triple-level cells store three-bits data of (1 1 1)$_2$, (1 0 1)$_2$, (1 0 0)$_2$, or (1 1 0)$_2$ respectively, and logic value b1 of the first bit B1 of these triple-level cells may be read as "1".

On the other hand, triple-level cells with threshold voltage distributions Vt(0,1,0), Vt(0,1,1), Vt(0,0,1) or Vt(0,0,0) may have threshold voltages Vt greater than the reading voltage Vr, these cells with threshold voltage distributions Vt(0,1,0), Vt(0,1,1), Vt(0,0,1) or Vt(0,0, 0) cannot be turned on. The cells which cannot be turned on, may store three-bits data of (0 1 0)$_2$, (0 1 1)$_2$, (0 0 1)$_2$ or (0 0 0)$_2$, and logical value b1 of the first bit B1 of these cells is determined as "0".

From the above, when the read voltage Vr applied by the control circuit 104 is set to be within a voltage range R1, the first bit B1 of the triple-level cell with different threshold voltage distributions can be read as logical value "1" or determined as logical value "0". Therefore, reading operation related to the first bit B1 of the triple-level cell may be referred to as one-time reading operation, and the reading voltage Vr of such one-time reading operation is between the threshold voltage distributions Vt(1,1,0) and Vt(0,1,0).

Next, referring to FIG. 2B, voltage range R2 is between the threshold voltage distributions Vt(1,1,1) and threshold voltage distributions Vt(1,0,1). Furthermore, voltage range R3 is between the threshold voltage distributions Vt(1,0,0) and threshold voltage distributions Vt(1,1,0). Moreover, voltage range R4 is between the threshold voltage distributions Vt(0,1,1) and threshold voltage distributions Vt(0,0,1).

For the triple-level cells with threshold voltage distributions Vt(1,1,1), all these triple-level cells have threshold voltages smaller than voltage values within voltage range R2. Therefore, as reading voltage Vr is set to be within voltage range R2 (to be reading voltage Vr2), reading voltage Vr2 is greater than threshold voltages of the mentioned triple-level cells, and hence, these triple-level cells can be turned-on by reading voltage Vr2 and can thus be read-out. These triple-level cells store three-bits data (1 1 1)$_2$ in which logic value b2 of the second bit B2 is "1". In other words, as the reading voltage Vr is set to be reading voltage Vr2, logic value b2 of the second bit B2 stored in these triple-level cells may be read-out as "1".

On the other hand, for the triple-level cells with threshold voltage distributions Vt(1,0,1) and the triple-level cells with threshold voltage distributions Vt(1,0,0), these triple-level cells have threshold voltages greater than voltage range R2 and smaller than voltage range R3. Therefore, the mentioned triple-level cells cannot be turned-on by reading voltage Vr2 and hence cannot be read-out. However, if the reading voltage Vr is increased to be within the voltage range R3 (to be reading voltage Vr3), the mentioned triple-level cells can be turned-on by reading voltage Vr3, and these triple-level cells can thus be read-out. The second bits B2 of these triple-level cells can be read-out as logic value b2 of "0".

In other words, the triple-level cells with threshold voltage distributions Vt(1,0,1) and Vt(1,0,0) cannot be turned-on by reading voltage Vr2, but can be turned-on by reading voltage Vr3. Accordingly, for the second bits B2 of these triple-level cells, the second bits B2 refer to an intersection of the read-out bits by reading voltage Vr2 and the read-out bits by reading voltage Vr3. The intersected second bits B2 have logic value b2 of "0".

On the other hand, for the triple-level cells with threshold voltage distributions Vt(1,1,0), Vt(0,1,0) and Vt(0,1,1), these triple-level cells have threshold voltages greater than voltage values within voltage range R3 and smaller than voltage values within voltage range R4. Reading voltage Vr3 cannot turn-on these triple-level cells, however, if reading voltage Vr is increased to be within voltage range R4 (to be reading voltage Vr4), such reading voltage Vr4 can turn-on these triple-level cells. That is, for the triple-level cells with threshold voltage distributions Vt(1,1,0), Vt(0,1,0) and Vt(0,1,1), the second bits B2 refer to an intersection of the read-out bits by reading voltage Vr3 and the read-out bits by reading voltage Vr4, and logic value b2 of the second bits B2 is "1".

In addition, for the triple-level cells with threshold voltage distributions Vt(0,0,1) and Vt(0,0,0), reading voltage Vr4 cannot turn-on these triple-level cells. The second bits B2 of these triple-level cells are determined as having logic value b2 of "0".

From the above, if the control circuit 104 reads the second bit B2 of the triple-level cell, the reading voltage Vr is set to be within the three voltage ranges R2, R3 and R4 (to be reading voltage Vr2, Vr3 and Vr4), and the second bit B2 of the triple-level cells with different threshold voltage distributions may be read or determined as logical value "1" or logical value "0". Therefore, reading operation related to the second bit B2 of the triple-level cell may be referred to as three-times reading operations. The reading voltage Vr of such three-times reading operations may be set to be between the threshold voltage distributions Vt(1,1,1) and Vt(1,0,1), between the threshold voltage distributions Vt(1,0,0) and Vt(1,1,0), and between the threshold voltage distributions Vt(0,1,1) and Vt(0,0,1).

Similar to the manner of reading operation of the second bit B2, the manner of reading the third bit B3 is shown in FIG. 2C. A voltage range R5 is between the threshold voltage distributions Vt(1,0,1) and Vt(1,0,0), a voltage range R6 is between the threshold voltage distributions Vt(0,1,0) and Vt(0,1,1), and a voltage range R7 is between the threshold voltage distributions Vt(0,0,1) and Vt(0,0,0). The control circuit 104 sequentially sets the reading voltage Vr to be within the three voltage ranges R5, R6, R7, and sequentially reads or determines the third bit B3 of the triple-level cell with different threshold voltage distributions as a logical value "1" or logical value "0". Therefore, reading operations related to the third bit B3 are also referred to as three-times reading operations, and the reading voltages Vr of such three-times reading operations are set to be between the threshold voltage distributions Vt(1,0,1) and Vt(1,0,0), between the threshold voltage distributions Vt(0,1,0) and Vt(0,1,1), and between the threshold voltage distributions Vt(0,0,1) and Vt(0,0,0) respectively.

In summary, for the first bit B1 of the triple-level cell, the reading voltage Vr is set to be within a voltage range R1 to perform one-time reading operation. For the second bit B2, the reading voltage Vr is sequentially set to be within the three voltage ranges R2, R3 and R4 to perform three-times reading operations. For the third bit B3, the reading voltage Vr is sequentially set to be within three voltage ranges R5, R6, and R7 to perform three-times reading operations. From the above, the arrangement of the threshold voltage distributions and the reading voltage Vr of the triple-level cell of the first embodiment may be referred to as a "1-3-3 arrangement". The reading time for reading operations of the first bit B1 is one. Furthermore, the reading times of the second bit B2 and the third bit B3 are equally assigned, so that the reading times of the second bit B2 and the third bit B3 are the same or close to each other. In the "1-3-3 arrangement" of the first embodiment, the reading times for both the second bit B2 and the third bit B3 are three.

In the "1-3-3 arrangement", the reading times for the second bit B2 and the third bit B3 are equally assigned, hence it's avoided that reading operations on a certain bit may be performed too many times and causing a increased reading error rate. For example, in a comparing example, the third bit B3 of the triple-level cell with the "1-2-4 arrangement" needs to be read by four times, so that the third bit B3 with the "1-2-4 arrangement" may have increased reading error rate. Hence, the stored data with the "1-2-4 arrangement" must be protected by a more complex error correction mechanism. For example, for the error correction code that encodes the stored data with the "1-2-4 configuration", more parity bits need to be placed other than the stored data. Therefore, the amount of additional data (overhead) may increase and may thus deteriorate data storage efficiency.

Figure 3:
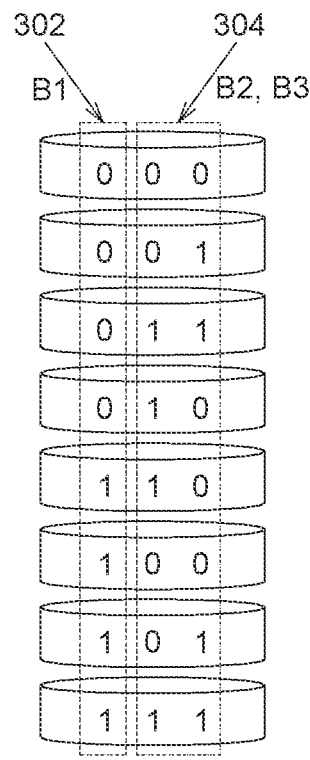
FIGS. 3 and 4 are schematic diagrams of an example of application for the storage device according to the first embodiment of the present disclosure.
Figure 4:
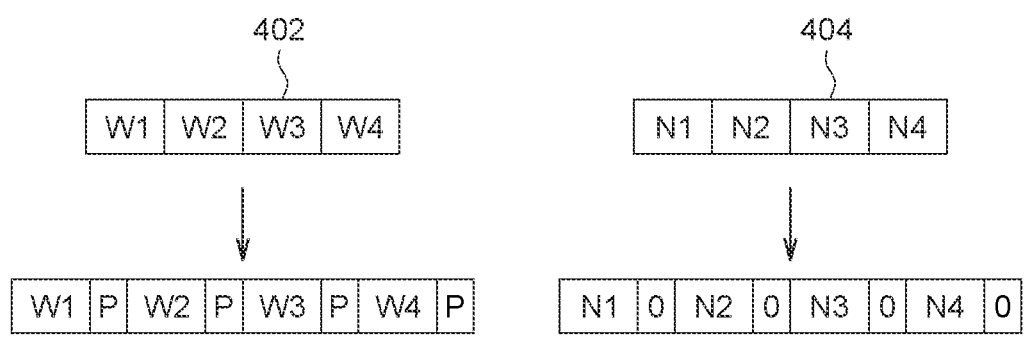

FIG. 3 and FIG. 4 are schematic diagrams of an example of application for the storage device 100 according to the first embodiment of the present disclosure. First, referring to FIG. 3, the storage device 100 having the triple-level cells with the "1-3-3 arrangement" can be used to store the weight data 302 and the normal data 304, and the weight data 302 may be applied to (Multiply and Accumulate, MAC) operations, such as bit-wise MAC operations. The weight data 302 of the bitwise MAC operations has a single-bit data format, hence the weight data 302 is stored in the first bit B1 (corresponding to the low page) of the triple-level cell with the "1-3-3 arrangement". On the other hand, the normal data 304 is general data stored in the memory circuit 102, and the normal data 304 is not limited to specific usage or application. In this embodiment, the normal data 304 is other general data than the weight data 302. In other words, the normal data 304 does not include the weight data 302 used for MAC operations, and the normal data 304 is not limited to being used for MAC operations. The normal data 304 is stored in the second bit B2 (corresponding to the middle page) and the third bit B3 (corresponding to the high page) of the triple-level cell. Reading operation for the first bit B1 of the triple-level cell of the "1-3-3 arrangement" of the present disclosure only needs to be performed one time, thus it is suitable for storing data of any type of bitwise operation. In contrast, in the "2-3-2 arrangement" of a comparing example, the first bit B1 needs to be read by two times. Therefore, the triple-level cell of the "2-3-2 configuration" cannot be used for storing data of bitwise operation.

Next, referring to FIG. 4, before the weight data 402 is stored in the first bit B1 of the triple-level cell, the weight data 402 can be encoded by an error correction code, and a plurality of parity bits P may be placed after data fields W1, W2, W3, W4 . . . of the weight data 402. When applied to the bitwise multiplication and accumulation operation, the data format of the normal data 404 and the weight data 402 must be consistent with each other. Thus, the normal data 404 may be correspondingly extended, placing padding bits (e.g., bits with logic value "0") after data fields N1, N2, N3, N4 . . . of the normal data 404 hence to correspond to the parity bits P of the weight data 402.

In the above-mentioned first embodiment, the multi-level cell refers to triple-level cell, and the multi-level cell of the second embodiment of the present disclosure refers to quad-level cell (QLC). Each quad-level cell has four bits, as the first bit B1, the second bit B2, the third bit B3 and the fourth bit B4 for storing four-bits data $(b1\ b2\ b3\ b4)_2$, and the four-bits data $(b1\ b2\ b3\ b4)_2$ of different logical values are $(1\ 1\ 1\ 1)_2$, $(1\ 1\ 1\ 0)_2$, $(1\ 1\ 0\ 0)_2$, $(1\ 0\ 0\ 0)_2$, $(1\ 0\ 1\ 0)_2$, $(1\ 0\ 1\ 1)_2$, $(1\ 0\ 0\ 1)_2$, $(1\ 1\ 0\ 1)_2$, $(0\ 1\ 0\ 1)_2$ $(0\ 0\ 0\ 1)_2$, $(0\ 0\ 0\ 0)_2$, $(0\ 0\ 1\ 0)_2$, $(0\ 0\ 1\ 1)_2$, $(0\ 1\ 1\ 1)_2$, $(0\ 1\ 1\ 0)_2$ or $(0\ 1\ 0\ 0)_2$ which correspond to different threshold voltage distributions Vt(1,1,1,1), Vt(1,1,1,0), Vt(1,1,0,0), (1,0,0,0), Vt(1,0,1,0), Vt(1,0,1,1), Vt(1,0,0,1), Vt(1,1,0,1), Vt(0,1,0,1), Vt(0,0,0,1), Vt(0,0,0,0), Vt(0,0,1,0), Vt(0,0,1,1), Vt(0,1,1,1), Vt(0,1,1,0) and Vt(0,1,0,0), in an order from low voltage to high voltage. According to the above-mentioned threshold voltage distributions, the control circuit 104 applies reading voltages Vr of different voltage values to read the four-bits data $(b1\ b2\ b3\ b4)_2$ stored in the quad-level cells, as will be described in detail in the following paragraphs.

FIGS. 5A to 5E are schematic diagrams of the threshold voltage distributions and the reading voltages Vr of the quad-level cells of the present disclosure. First, referring to FIG. 5A, for the reading operation of the first bit B1 of the quad-level cell, a voltage range R1 may be between the threshold voltage distributions Vt(1,1,0,1) and Vt(0,1,0,1). When the reading voltage Vr applied by the control circuit 104 is set to be within the voltage range R1, quad-level cells with threshold voltage distributions Vt(1,1,1,1), Vt(1,1,1,0), Vt(1,1,0,0), Vt(1,0,0,0), Vt(1,0,1,0), Vt(1,0,1,1), Vt(1,0,0,1), Vt(1,1,0,1) may have a threshold voltage Vt less than the reading voltage Vr, and such quad-level cells can be turned on, and then the logic value "1" of the first bit B1 can be read. On the other hand, quad-level cells with threshold voltage distributions Vt(0,1,0,1), Vt(0,0,0,1), Vt(0,0,0,0), Vt(0,0,1,0), Vt(0,0,1,1), Vt(0,1,1,1), Vt(0,1,1,0) and Vt(0,1,0,0) may have a threshold voltage Vt greater than the reading voltage Vr, and such quad-level cells cannot be turned on. The first bit B1 of these cells may be determined as logic value "0". Since the reading voltage Vr is set within a voltage range R1, the reading operation related to the first bit B1 of the quad-level cell is referred to as one-time reading operation.

Figure 5A:
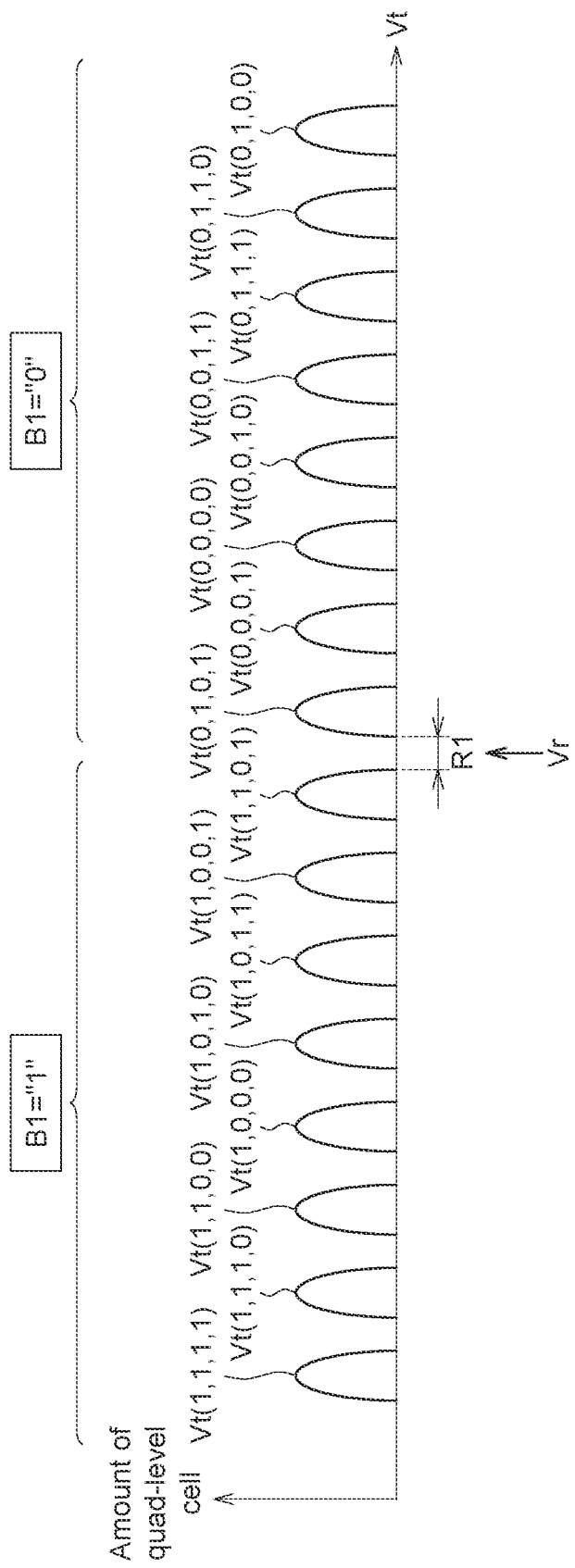
FIGS. 5A to 5E are schematic diagrams of the threshold voltage distributions and the reading voltages of the quad-level cells of the present disclosure.
Figure 5B:
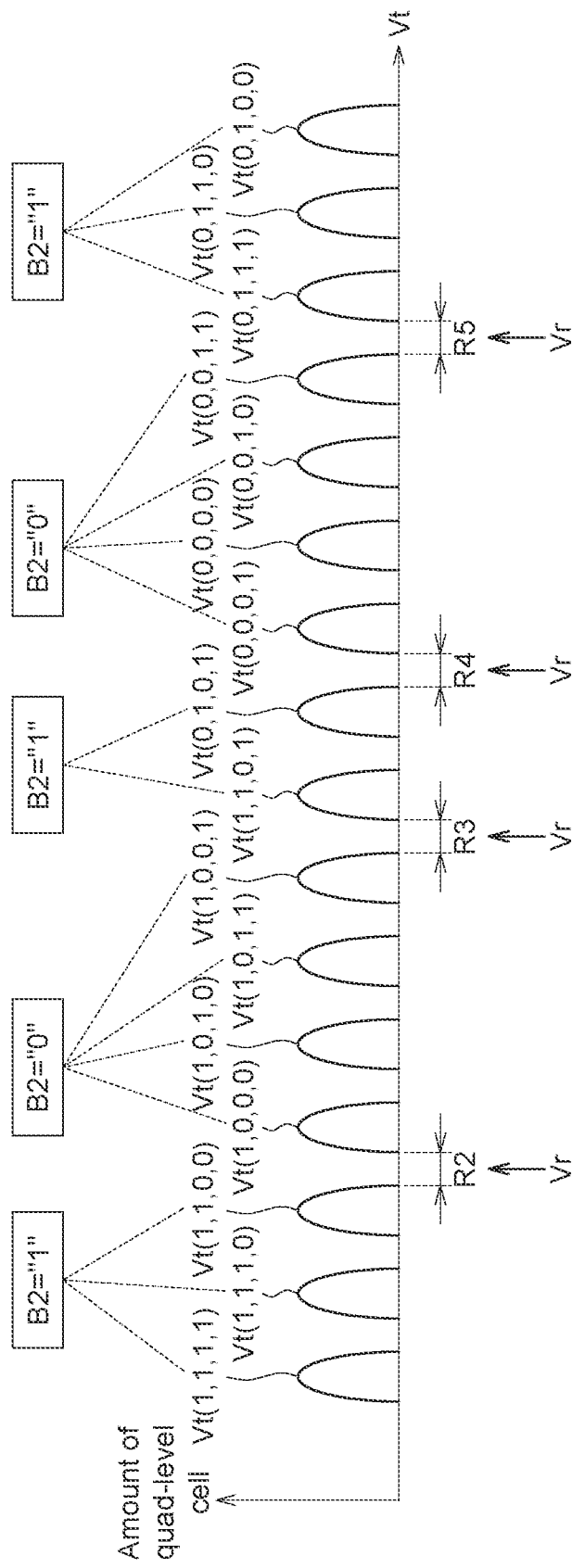

For the reading operations of the second bit B2 of the quad-level cell, referring to FIG. 5B, a voltage range R2 may be between the threshold voltage distributions Vt(1,1,0,0) and Vt(1,0,0,0), a voltage range R3 may be between the critical voltage distribution Vt(1,0,0,1) and Vt(1,1,0,1), a voltage range R4 may be between the threshold voltage distributions Vt(0,1,0,1) and Vt(0,0,0,1), and a voltage range R5 may be between the threshold voltage distributions Vt(0,0,1,1) and Vt(0,1,1,1). When the reading voltage Vr applied by the control circuit 104 is sequentially set to be within the four voltage ranges R2, R3, R4 and R5, the second bit B2 of the quad-level cells with different threshold voltage distributions can be sequentially determined as logical value "1" or logical value "0". Therefore, the reading operations related to the second bit B2 of the quad-level cell is referred to as four-times reading operations.

Figure 5C:
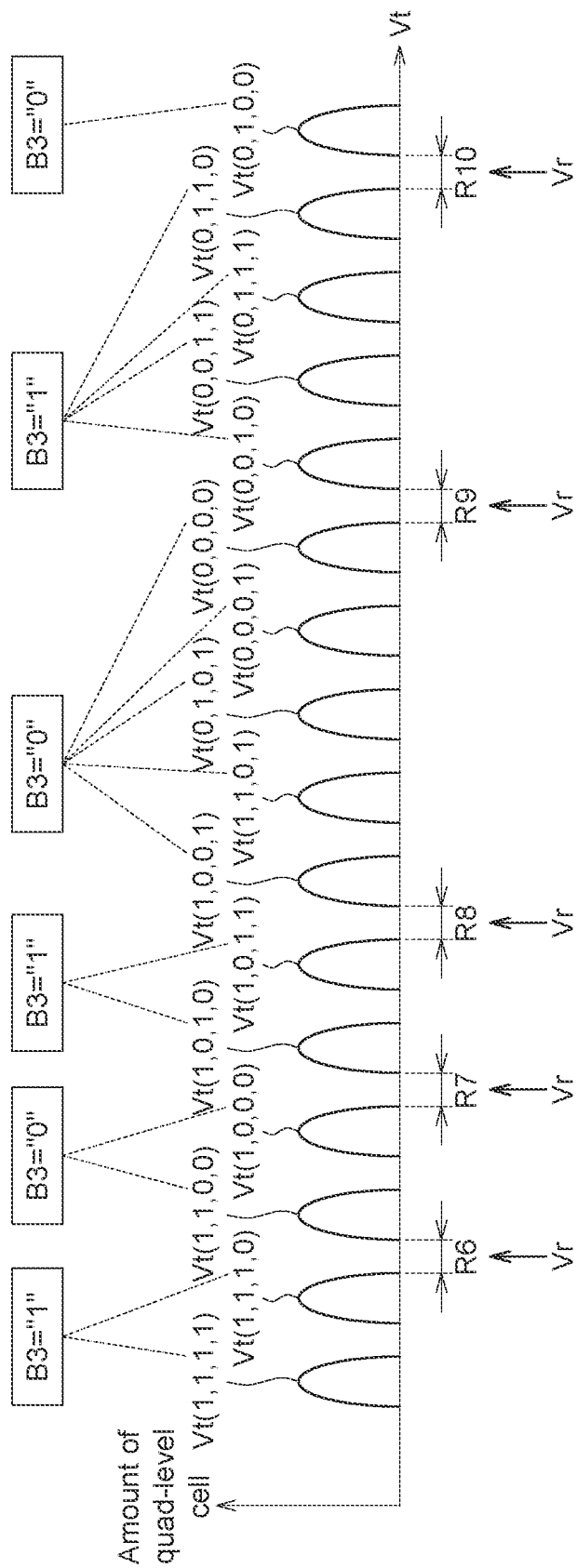

Similarly, referring to FIG. 5C, for the reading operation of the third bit B3 of the quad-level cells, between the threshold voltage distributions Vt(1,1,1,0) and Vt(1,1,0,0) may be a voltage range R6, between the threshold voltage distribution Vt(1,0,0,0) and Vt(1,0,1,0) may be a voltage range R7, between the threshold voltage distributions Vt(1,0,1,1) and Vt(1,0,0,1) may be a voltage range R8, between the threshold voltage distributions Vt(0,0,0,0) and Vt(0,0,1, 0) may be a voltage range R9, and between the threshold voltage distributions Vt(0,1,1,0) and Vt(0,1,0,0) may be a voltage range R10. When the reading voltage Vr applied by the control circuit 104 is sequentially set to be within the five voltage ranges R6, R7, R8, R9 and R10, the third bit B3 of the quad-level cells with different threshold voltage distributions can be sequentially determined as a logical value "1" or a logical value "0". Therefore, the reading operations related to the third bit B3 of the quad-level cell may be referred to as five-times reading operations.

Figure 5D:
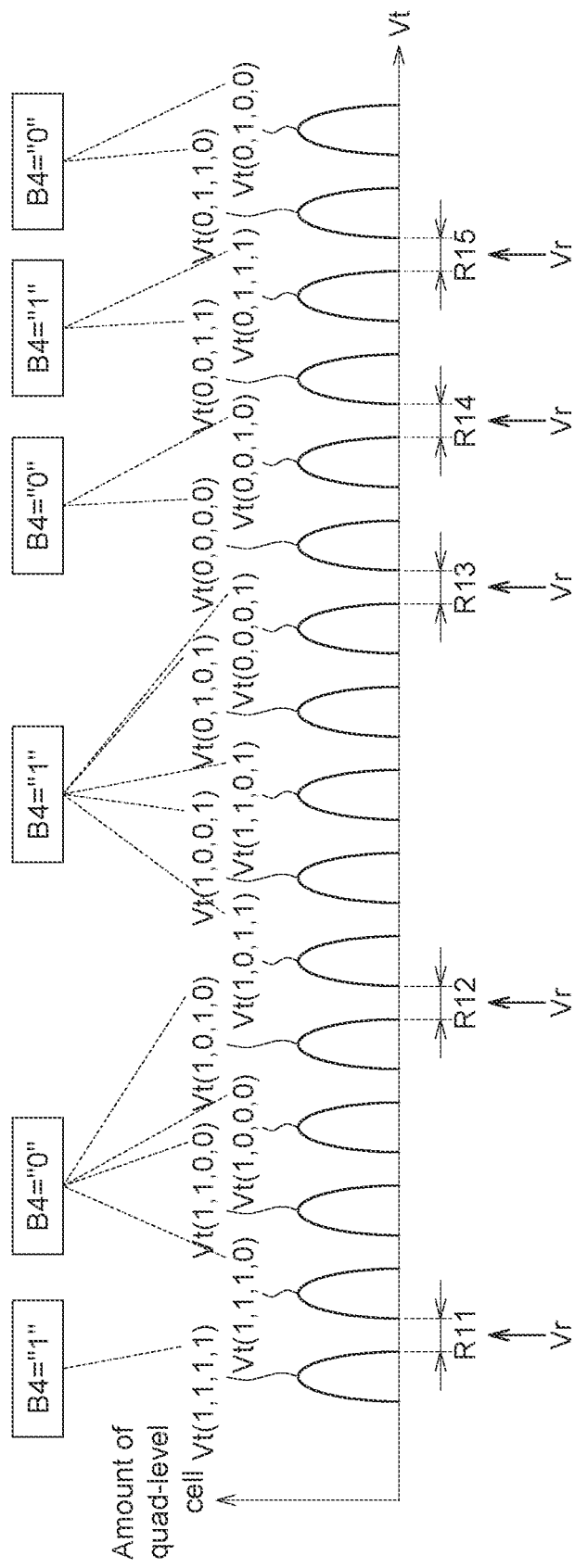

Similarly, referring to FIG. 5D, for the reading operations of the fourth bit B4 of the quad-level cell, a voltage range R11 may be between the threshold voltage distributions Vt(1,1,1,1) and Vt(1,1,1,0), a voltage range R12 may be between the threshold voltage distributions Vt(1,0,1,0) and Vt(1,0,1,1), a voltage range R13 may be between threshold voltage distribution Vt(0,0,0,1) and Vt(0,0,0,0), a voltage range R14 may be between threshold voltage distribution Vt(0,0,1,0) and Vt(0,0,1,1), and a voltage range R15 may be between threshold voltage distribution Vt(0,1,1,1) and Vt(0,1,1,0). When the reading voltage Vr applied by the control circuit 104 is sequentially set to be within the five voltage ranges R11, R12, R13, R14 and R15, the fourth bit B4 of the quad-level memory cells with different threshold voltage distributions can be sequentially determined as a logical value "1" or a logical value "0". Therefore, the reading operations related to the fourth bit B4 of the quad-level cell may be referred to as five-times reading operations.

Figure 5E:
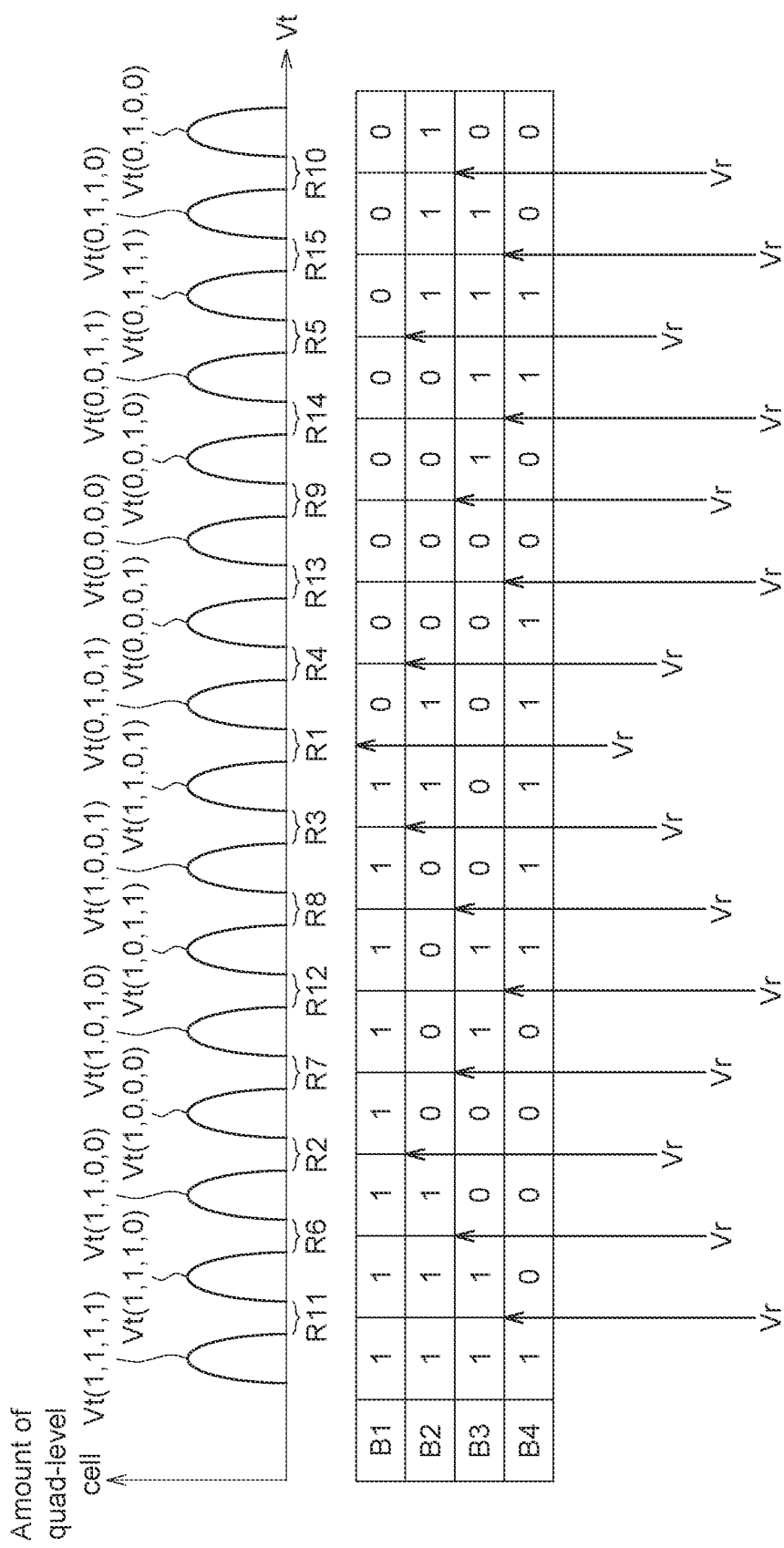

In summary, by further reference to FIG. 5E, when the control circuit 104 of the second embodiment reads the first bit B1 of the quad-level cell, reading voltage Vr is set within a voltage range R1 to perform one-time reading operation. When reading the second bit B2, the reading voltage Vr is sequentially set within the four voltage ranges R2, R3, R4, and R5 to perform four-times reading operations. When reading the third bit B3, the reading voltage Vr is sequentially set within the five voltage ranges R6, R7, R8, R9, and R10 to perform five-times reading operations. When reading the fourth bit B4, the reading voltage Vr is sequentially set within the five voltage ranges R11, R12, R13, R14, and R15 to perform five-times reading operations. Therefore, the arrangement of the threshold voltage distribution and the read voltage Vr of the quad-level cell of the second embodiment may be referred to as "1-4-5-5 arrangement". Reading times for the first bit B1 is one, and reading times of the second to fourth bits B2~B4 are equally assigned so that reading times of the second to fourth bits B2~B4 are the same or close to one another to avoid reading times being mostly assigned to a certain bit. For example, for the fourth bit B4 of the quad-level cell with the "1-2-4-8 arrangement" of another comparing example, eight times of reading operations are required, so that error rate of reading the fourth bit B4 may be increased. And hence, the amount of additional data (overhead) required by the error correction code for the data stored in the quad-level memory cell of the "1-2-4-8 arrangement" is also increased.

Figure 6:
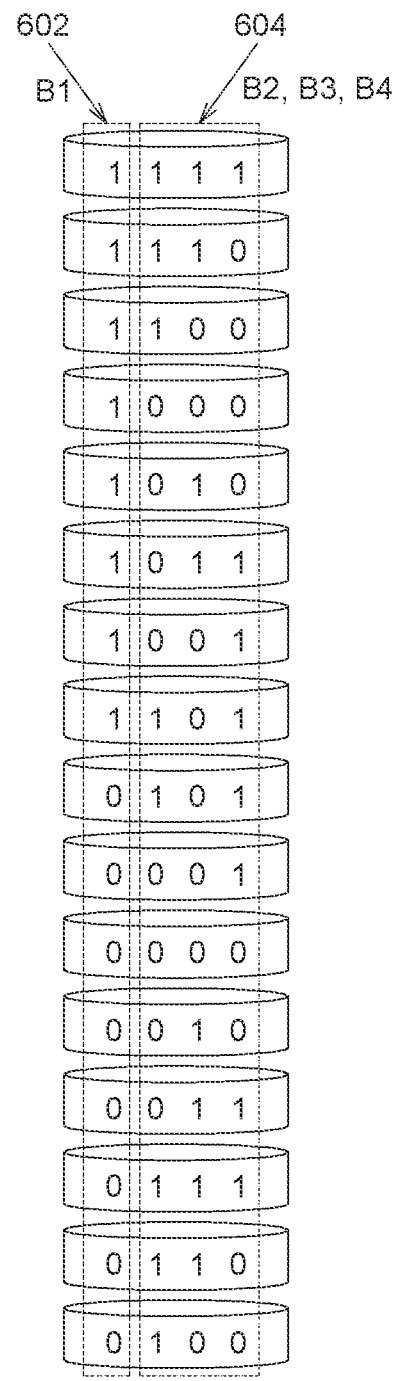
FIG. 6 is a schematic diagram of an example of application for the storage device according to the second embodiment of the present disclosure.

FIG. 6 is a schematic diagram of an example of application for the storage device 100 according to the second embodiment of the present disclosure. Referring to FIG. 6, the storage device 100 with quad-level cells of the "1-4-5-5 arrangement" may be applied to store weight data 602 and normal data 604 for a bitwise multiplication and accumulation operation. Reading operation for the first bit B1 of the quad-level cell of "1-4-5-5 arrangement" needs to be performed by one time, so that it is suitable for storing the weight data 602 of the bitwise multiplication and accumulation operation, while the second to fourth bits B2~B4 of the quad-level cells are used to store the normal data 604 of bitwise multiplication and accumulation operations. In contrast, for the first bit B1 of the quad-level cell of the "3-44-4 arrangement" of another comparing example, it needs to perform reading operations by three-times, thus it is not suitable for storing data of bitwise operations.

As in the first and second embodiments, the control circuit 104 reads the first bit B1 according to one-time reading operation related to the first bit B1 of the multi-level cell, reads the second bit B2 according to M-times reading operations related to the second bit B2 of the multi-level cell, and reads the third bit B3 according to N-times reading operations related to the third bit B3 of the multi-level cell. Furthermore, if the multi-level cell has more than four levels, such multi-level cell reads the fourth bit B4 according to P-times reading operations related to the fourth bit B4 of the multi-level cell. The number of reading times is equally assigned to the second to fourth bits B2 to B4, so that the difference between any two of M, N, and P is less than or equal to 1. For example, in the "1-3-3 arrangement" of the triple-level cell of the first embodiment, both M and N are three, and the difference between M and N is zero. In the "1-4-5-5 arrangement" of the quad-level cell of the second embodiment, M is four, N is five, and P is five, the difference between any two of M, N, and P is equal to one or zero.

Figure 7:
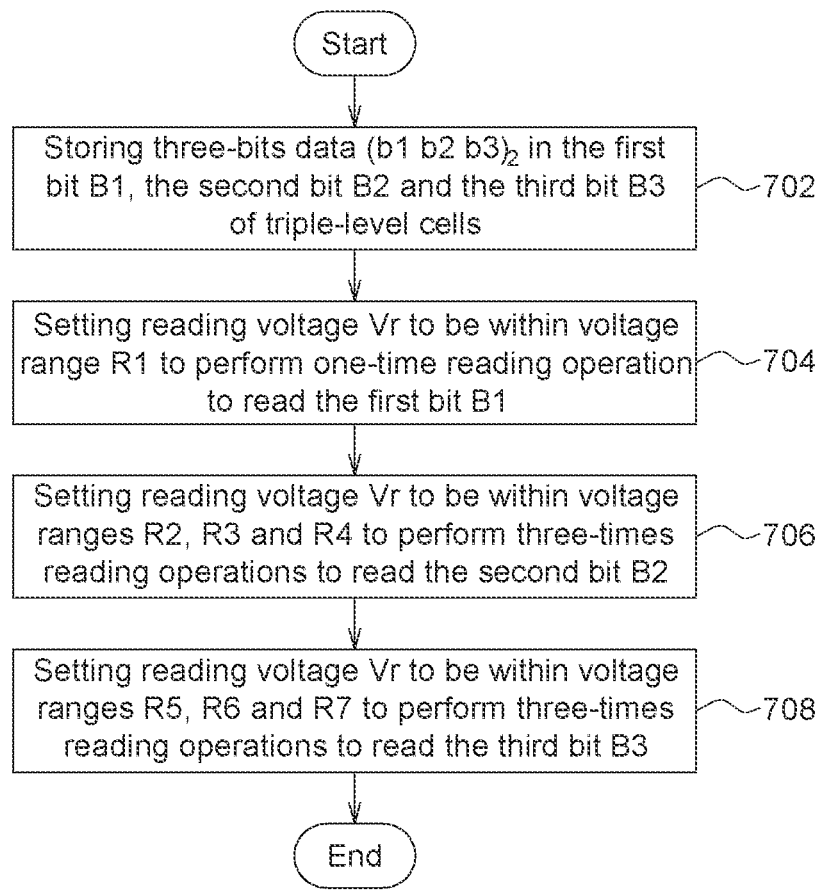
FIG. 7 is a flowchart of a data accessing method according to the first embodiment of the present disclosure.

FIG. 7 is a flowchart of a data accessing method according to the first embodiment of the present disclosure. The data accessing method of the first embodiment may be applied to the storage device 100 of the first embodiment to access data stored in the triple-level cell. And, the data accessing method of the first embodiment may be carried out with the setting range of the reading voltage Vr shown in FIGS. 2A to 2C.

First, in step 702, a plurality of three-bits data (b1 b2 b3)$_2$ are stored in the first bit B1, the second bit B2, and the third bit B3 of the plurality of triple-level cells in the memory circuit 102. The first bit B1 corresponds to the first page (low page), the second bit B2 corresponds to the second page (middle page), and the third bit B3 corresponds to the third page (high page). In one example, the data accessing method of the first embodiment can be used to store the weight data 602 of the multiplication and accumulation operation and the normal data 604. The weight data 602 is stored in the first bit B1 of the third-level cell, while the normal data 602 is stored in the second bit B2 and the third bit B3 of the third-level cell.

Next, in step 704, the reading voltage Vr is set within the voltage range R1 to perform one-time reading operation, and the first bit B1 of the triple-level cell is read. The voltage range R1 is between the threshold voltage distributions Vt(1,1,0) and Vt(0,1,0).

Next, in step 706, the reading voltage Vr is sequentially set within the voltage ranges R2, R3 and R4 to perform three-times reading operations, and the second bit B2 of the triple-level memory cell is read. The voltage range R2 is between the threshold voltage distributions Vt(1,1,1) and Vt(1,0,1), and the voltage range R3 is between the threshold voltage distributions Vt(1,0,0) and Vt(1,1,0), and the voltage range R4 is between the threshold voltage distributions Vt(0,1,1) and Vt(0,0,1).

Next, in step 708, the reading voltage Vr is sequentially set within the voltage ranges R5, R6 and R7 to perform three-times reading operations, and the third bit B3 of the triple-level cell is read. The voltage range R5 is between the threshold voltage distributions Vt(1,0,1) and Vt(1,0,0), and the voltage range R6 is between the threshold voltage distributions Vt(0,1,0) and Vt(0),1,1), the voltage range R7 is between the threshold voltage distributions Vt(0,0,1) and Vt(0,0,0).

Figure 8:
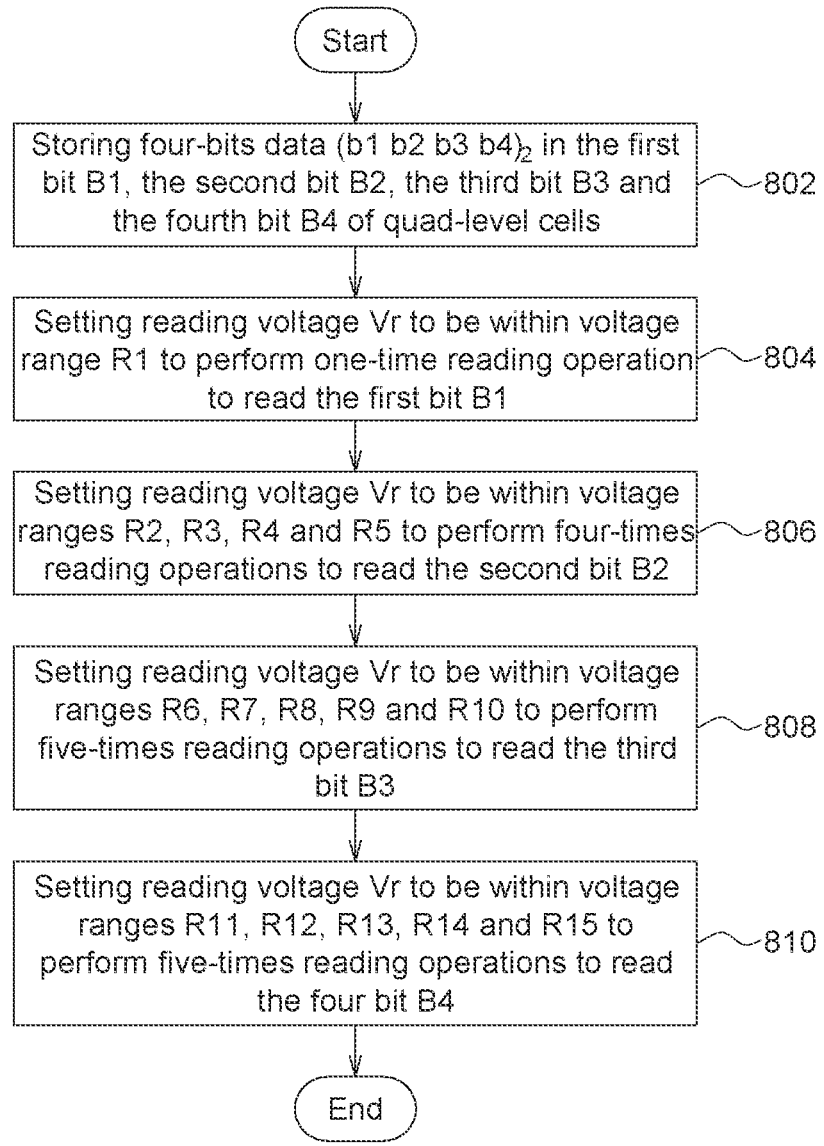
FIG. 8 is a flowchart of a data accessing method according to the second embodiment of the present disclosure.

FIG. 8 is a flowchart of a data accessing method according to the second embodiment of the present disclosure. The data accessing method of the second embodiment may be applied to the storage device 100 of the second embodiment to access data stored in the quad-level cells. Furthermore, the data accessing method of the second embodiment may be carried out with the setting range of the reading voltage Vr shown in FIGS. 5A to 5D.

First, in step 802, storing a plurality of four-bits data (b1 b2 b3 b4)$_2$ in the first bit B1, the second bit B2, the third bit B3 and the fourth bit B4 of the plurality of quad-level cells in the memory circuit 102. In one example, the data accessing method of the second embodiment can be used to store the weight data and normal data of the multiplication and accumulation operation. The weight data is stored in the first bit B1 of the quad-level cell, and the normal data is stored in the second bit B2, the third bit B3, and the fourth bit B4 of the quad-level cell.

Next, in step 804, the reading voltage Vr is set within the voltage range R1 to perform one-time reading operation, and the first bit B1 of the quad-level cell is read. The voltage range R1 is between the threshold voltage distributions Vt(1,1,0,1) and Vt(0,1,0,1).

Next, in step 806, the reading voltage Vr is sequentially set within the voltage ranges R2, R3, R4 and R5 to perform four-times reading operations, and the second bit B2 of the quad-level cell is read. The voltage range R2 is between the threshold voltage distribution Vt(1,1,0,0) and Vt(1,0,0,0), the voltage range R3 is between the threshold voltage distribution Vt(1,0,0, 1) and Vt(1,1,0,1), the voltage range R4 is between the threshold voltage distribution Vt(0,1,0,1) and Vt(0,0,0,1), and the voltage range R5 is between the threshold voltage distribution Vt(0,0,1,1) and Vt(0,1,1,1).

Next, in step 808, the reading voltage Vr is sequentially set within the voltage ranges R6, R7, R8, R9 and R10 to perform five-times reading operations, and the third bit B3 of the quad-level memory cell is read. The voltage range R6 is between the threshold voltage distribution Vt(1,1,1,0) and Vt(1,1,0,0), the voltage range R7 is between the threshold voltage distribution Vt(1,0,0,0) and Vt(1,0,1,0), the voltage range R8 is between the threshold voltage distribution Vt(1,0,1,1) and Vt(1,0,0,1), the voltage range R9 is between the threshold voltage distribution Vt(0,0,0,0) and Vt(0,0,1, 0), and the voltage range R10 is between the threshold voltage distribution Vt(0,1,1,0) and Vt (0,1,0,0).

Next, in step 810, the reading voltage Vr is sequentially set within the voltage ranges R11, R12, R13, R14 and R15 to perform five-times reading operations, and the fourth bit B4 of the quad-level cell is read. The voltage range R11 is between the threshold voltage distribution Vt(1,1,1,1) and Vt(1,1,1,0), the voltage range R12 is between the threshold voltage distribution Vt(1,0,1,0) and Vt(1,0,1,1), the voltage range R13 is between the threshold voltage distribution Vt(0,0,0,1) and Vt(0,0,0,0), the voltage range R14 is between the threshold voltage distribution Vt(0,0,1,0) and Vt(0,0,1,1), and the voltage range R15 is between the threshold voltage distribution Vt(0,1,1,1) and Vt (0,1,1,0).

Figure 9:
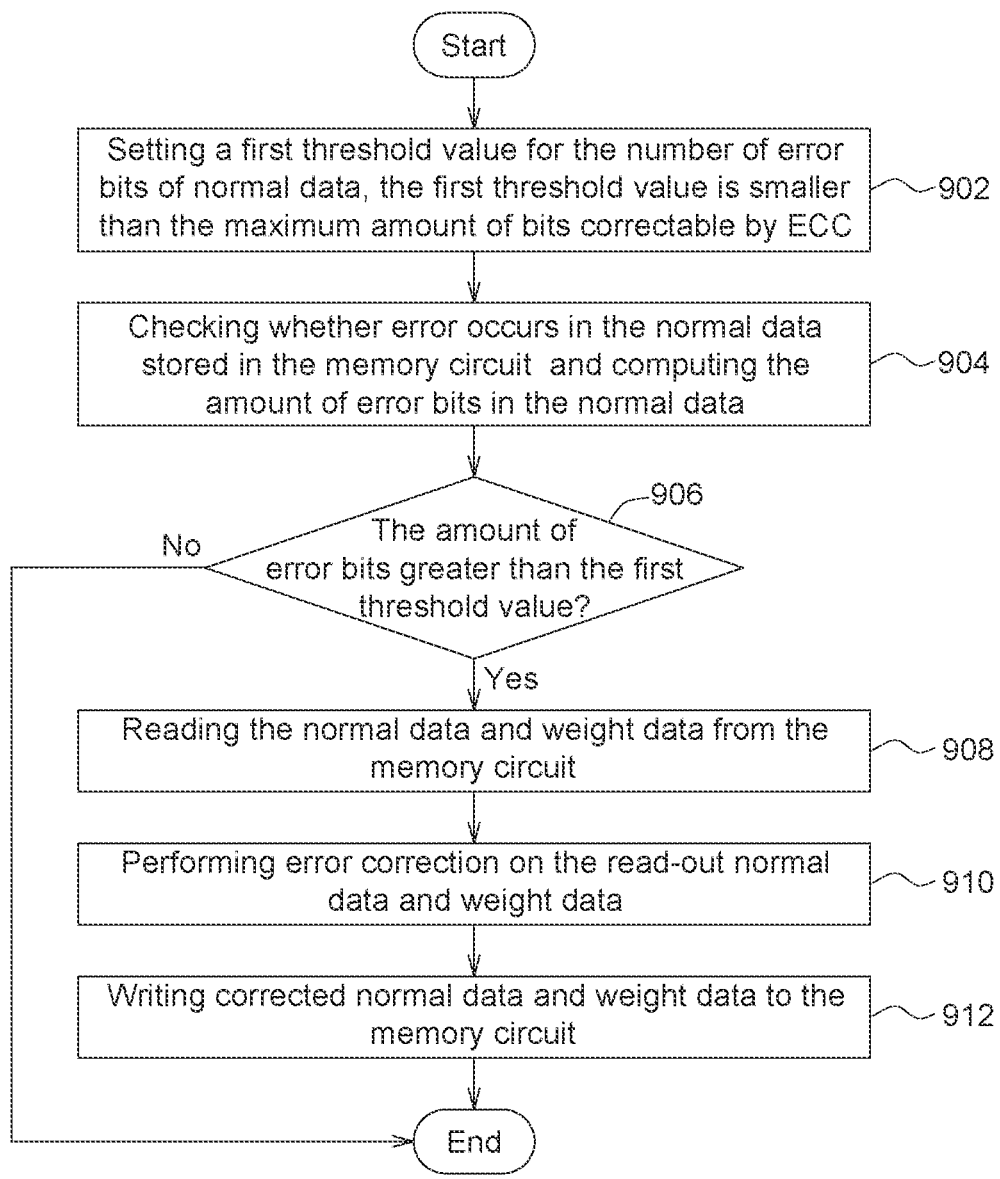
FIG. 9 is a flowchart of a data updating method according to the present disclosure.

FIG. 9 is a flowchart of a data updating method according to the present disclosure. If certain bits of the multi-level cell of the storage device 100 may need to be performed with multiple-times reading operations and may easily cause reading errors, the control circuit 104 may execute a data updating method to correct errors. The data updating method of FIG. 9 can also be carried out with the data accessing methods of FIGS. 7 and 8. Referring to FIG. 9, in step 902, setting first threshold value, and the first threshold value is a threshold value of fail bit count ($FBC_{th}$). In this embodiment, the first threshold value is a threshold value of the amounts of error bits of the normal data. The first threshold value must be within the correction capability of the error correction code. In other words, the first threshold value must be less than the maximum amount of bits that can be corrected by the error correction code.

Next, in step 904, checking whether data stored in the multi-level cells in the memory circuit 102 have error(s) (i.e., checking whether the data have error bit(s)). If error(s) occurs, the number of error bits is calculated. In this embodiment, substantially, low page (i.e., the first bits of the triple-level cells) the memory circuits 102 persistently stores the weight data, hence the weight data is seldom read out to the external circuit or changed by user. Furthermore, reading operation for the weight data refers to one-time reading, with fewer numbers of reading operation and hence less possibility of data error or damage. Therefore, in the data updating method of this embodiment, the weight data is not checked.

On the other hand, middle page and high page (i.e., the second bits and the third bits of the triple-level cells) of the memory circuits 102 store the normal data, which is general data usually read out to external circuit. Furthermore, reading operations of the normal data refer to multiple-times reading operations (at least three-times reading) and hence data errors may easily occur in the normal data. Therefore, in the data updating method of this embodiment, the checking is performed to the normal data to examine error bits therein and calculate amounts (or number) of such error bits.

Next, in step 906, comparing the number of error bits in the normal data with the first threshold value. If the number of error bits of the normal data is greater than the first threshold value, data updating is to be performed, and then executing step 908. On the other hand, if the number of error bits of the normal data is less than or equal to the first threshold value, no data updating is required.

In step 908, entirely data updating for data in the memory circuit 102 is performed. In other words, both the normal data and the weight data are updated. The control circuit 104 reads the weight data and the normal data from all pages (i.e., low page, middle page and high page) of the memory circuit 102. In other words, the weight data is read from the first bits of the multiple-level cells, and the normal data is read from the second, the third and/or the fourth bits of the multiple-level cells.

Next, in step 910, the control circuit 104 decodes the read-out normal data with the error correction code, and then corrects the error bits in the normal data. Furthermore, the control circuit 104 updates the read-out weight data.

Next, in step 912, the control circuit 104 writes the updated weight data and the corrected normal data to the first to the third and/or the fourth bits of the multiple-level cells.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A storage device, comprising:
a memory circuit, configured to store a plurality of first bits in a first page, a plurality of second bits in a second page and a plurality of third bits in a third page, wherein the memory circuit includes a plurality of multi-level cells, each of the multi-level cells is of a same type and configured to store a same number of bits of data which include at least a corresponding first bit of the plurality of first bits in the first page, a corresponding second bit of the plurality of second bits in the second page, and a corresponding third bit of the plurality of third bits in the third page, such that the plurality of multi-level cells store the first page, the second page, and the third page; and
a control circuit, configured to:
encode weight data with parity fields placed after data fields of the weight data and store the encoded weight data in the plurality of first bits in the first page;
extend normal data with padding in locations to correspond to locations of the parity fields and store the extended normal data in the plurality of second bits in the second page and in the plurality of third bits in the third page; and
read the plurality of first bits according to a one-time reading operation related to the corresponding first bit of each multi-level cell, read the plurality of second bits according to M reading operations related to the corresponding second bit of each multi-level cell, and read the plurality of third bits according to N reading operations related to the corresponding third bit of each multi-level cell, wherein a magnitude of a difference between M and N is less than or equal to 1,
wherein the weight data is used in a multiplication and accumulation operation, and the normal data is data other than weight data.

2. The storage device according to claim 1, wherein each cell of the plurality of multi-level cells is a triple-level cell, the first page is a low page, the second page is a middle page, and the third page is a high page.

3. The storage device according to claim 1, wherein each cell of the plurality of multi-level cells is a triple-level cell configured to store three bits of data, wherein the three bits of data are $(1\ 1\ 1)_2$, $(1\ 0\ 1)_2$, $(1\ 0\ 0)_2$, $(1\ 1\ 0)_2$, $(0\ 1\ 0)_2$, $(0\ 1\ 1)_2$, $(0\ 0\ 1)_2$ or $(0\ 0\ 0)_2$ respectively corresponding to a plurality of threshold voltage distributions Vt(1,1,1), Vt(1,0,1), Vt(1,0,0), Vt(1,1,0), Vt(0,1,0), Vt(0,1,1), Vt(0,0,1) and Vt(0,0,0), and the threshold voltage distributions Vt(1,1,1), Vt(1,0,1), Vt(1,0,0), Vt(1,1,0), Vt(0,1,0), Vt(0,1,1), Vt(0,0,1) and Vt(0,0,0) are arranged in an order from low voltage to high voltage.

4. The storage device according to claim 3, wherein M=3, N=3, a reading voltage of the one-time reading operation related to the corresponding first bit of each multi-level cell is between Vt(1,1,0) and Vt(0,1,0), reading voltages of the M reading operations related to the corresponding second bit of each multi-level cell are between Vt(1,1,1) and Vt(1,0,1), between Vt(1,0,0) and Vt(1,1,0), and between Vt(0,1,1) and Vt(0,0,1) respectively, and reading voltages of the N reading operations related to the corresponding third bit of each multi-level cell are between Vt(1,0,1) and Vt(1,0,0), between Vt(0,1,0) and Vt(0,1,1), and between Vt(0,0,1) and Vt(0,0,0) respectively.

5. The storage device according to claim 1, wherein the memory circuit is a two-dimensional (2D) NAND flash memory, a 2D phase change memory (2D PCM), a 2D resistive random access memory (2D RRAM), or a 2D magnetoresistive random access memory (2D MRAM), and the plurality of multi-level cells are 2D memory cells.

6. The storage device according to claim 1, wherein the memory circuit is a three-dimensional (3D) NAND flash memory, a 3D phase change memory (3D PCM), a 3D resistive random access memory (3D RRAM), or a 3D magnetoresistive random access memory (3D MRAM), and the plurality of multi-level cells are 3D memory cells.

7. The storage device according to claim 1, wherein each cell of the plurality of multi-level cells is a quad-level cell and is further configured to store a corresponding fourth bit of a plurality of fourth bits for a fourth page, the control circuit is further configured to read the plurality of fourth bits according to P reading operations related to the corresponding fourth bit of each multi-level cell, and a magnitude of a difference between each of P and M, P and N, and M and N is less than or equal to 1.

8. The storage device according to claim 7, wherein each cell of the plurality of multi-level cells is configured to store four bits of data, the four bits of data are $(1\ 1\ 1\ 1)_2$, $(1\ 1\ 1\ 0)_2$, $(1\ 1\ 0\ 0)_2$, $(1\ 0\ 0\ 0)_2$, $(1\ 0\ 1\ 0)_2$, $(1\ 0\ 1\ 1)_2$, $(1\ 0\ 0\ 1)_2$, $(1\ 1\ 0\ 1)_2$, $(0\ 1\ 0\ 1)_2$, $(0\ 0\ 0\ 1)_2$, $(0\ 0\ 0\ 0)_2$, $(0\ 0\ 1\ 0)_2$, $(0\ 0\ 1\ 1)_2$, $(0\ 1\ 1\ 1)_2$, $(0\ 1\ 1\ 0)_2$ or $(0\ 1\ 0\ 0)_2$ respectively corresponding to a plurality of threshold voltage distributions $Vt(1,1,1,1)$, $Vt(1,1,1,0)$, $Vt(1,1,0,0)$, $Vt(1,0,0,0)$, $Vt(1,0,1,0)$, $Vt(1,0,1,1)$, $Vt(1,0,0,1)$, $Vt(1,1,0,1)$, $Vt(0,1,0,1)$, $Vt(0,0,0,1)$, $Vt(0,0,0,0)$, $Vt(0,0,1,0)$, $Vt(0,0,1,1)$, $Vt(0,1,1,1)$, $Vt(0,1,1,0)$ and $Vt(0,1,0,0)$, and the threshold voltage distributions $Vt(1,1,1,1)$, $Vt(1,1,1,0)$, $Vt(1,1,0,0)$, $Vt(1,0,0,0)$, $Vt(1,0,1,0)$, $Vt(1,0,1,1)$, $Vt(1,0,0,1)$, $Vt(1,1,0,1)$, $Vt(0,1,0,1)$, $Vt(0,0,0,1)$, $Vt(0,0,0,0)$, $Vt(0,0,1,0)$, $Vt(0,0,1,1)$, $Vt(0,1,1,1)$, $Vt(0,1,1,0)$ and $Vt(0,1,0,0)$ are arranged in an order from low voltage to high voltage.

9. The storage device according to claim 8, wherein M=4, N=5, P=5, a reading voltage of the one-time reading operation related to the corresponding first bit of each multi-level cell is between $Vt(1,1,0,1)$ and $Vt(0,1,0,1)$, reading voltages of the M reading operations related to the corresponding second bit of each multi-level cell are between $Vt(1,1,0,0)$ and $Vt(1,0,0,0)$, between $Vt(1,0,0,1)$ and $Vt(1,1,0,1)$, between $Vt(0,1,0,1)$ and $Vt(0,0,0,1)$, and between $Vt(0,0,1,1)$ and $Vt(0,1,1,1)$ respectively, reading voltages of the N reading operations related to the corresponding third bit of each multi-level cell are between $Vt(1,1,1,0)$ and $Vt(1,1,0,0)$, between $Vt(1,0,0,0)$ and $Vt(1,0,1,0)$, between $Vt(1,0,1,1)$ and $Vt(1,0,0,1)$, between $Vt(0,0,0,0)$ and $Vt(0,0,1,0)$, and between $Vt(0,1,1,0)$ and $Vt(0,1,0,0)$ respectively, and reading voltages of the P reading operations related to the corresponding fourth bit of each multi-level cell are between $Vt(1,1,1,1)$ and $Vt(1,1,1,0)$, between $Vt(1,0,1,0)$ and $Vt(1,0,1,1)$, between $Vt(0,0,0,1)$ and $Vt(0,0,0,0)$, between $Vt(0,0,1,0)$ and $Vt(0,0,1,1)$, and between $Vt(0,1,1,1)$ and $Vt(0,1,1,0)$) respectively.

10. A data accessing method, for applying to a memory circuit which stores a plurality of first bits in a first page, a plurality of second bits in a second page and a plurality of third bits in a third page, wherein the memory circuit includes a plurality of multi-level cells, each of the multi-level cells is of a same type and configured to store a same number of bits of data which include at least a corresponding first bit of the plurality of first bits in the first page, a corresponding second bit of the plurality of second bits in the second page and a corresponding third bit of the plurality of third bits in the third page, such that the plurality of multi-level cells store the first page, the second page, and the third page, and data accessing method comprising:
encoding weight data with parity fields placed after data fields in the weight data and storing the encoded weight data in the plurality of first bits in the first page;
extending normal data with padding in locations to correspond to locations of the parity fields and storing the extended normal data in the plurality of second bits in the second page and the plurality of third bits in the third page;
reading the plurality of first bits according to a one-time reading operation related to the corresponding first bit of each multi-level cell;
reading the plurality of second bits according to M reading operations related to the corresponding second bit of each multi-level cell; and
reading the plurality of third bits according to N reading operations related to the corresponding third bit of each multi-level cell,
wherein a magnitude of a difference between M and N is less than or equal to 1, the weight data is used in a multiplication and accumulation operation, and the normal data is data other than weight data.

11. The data accessing method according to claim 10, wherein each cell of the plurality of multi-level cells is a triple-level cell configured to store three bits of data, wherein the three bits of data are $(1\ 1\ 1)_2$, $(1\ 0\ 1)_2$, $(1\ 0\ 0)_2$, $(1\ 1\ 0)_2$, $(0\ 1\ 0)_2$, $(0\ 1\ 1)_2$, $(0\ 0\ 1)_2$ or $(0\ 0\ 0)_2$ respectively corresponding to a plurality of threshold voltage distributions $Vt(1,1,1)$, $Vt(1,0,1)$, $Vt(1,0,0)$, $Vt(1,1,0)$, $Vt(0,1,0)$, $Vt(0,1,1)$, $Vt(0,0,1)$ and $Vt(0,0,0)$, and the threshold voltage distributions $Vt(1,1,1)$, $Vt(1,0,1)$, $Vt(1,0,0)$, $Vt(1,1,0)$, $Vt(0,1,0)$, $Vt(0,1,1)$, $Vt(0,0,1)$ and $Vt(0,0,0)$ are arranged in an order from low voltage to high voltage.

12. The data accessing method according to claim 11, wherein M=3, N=3, and the data accessing method further comprises:
setting a reading voltage to be between $Vt(1,1,0)$ and $Vt(0,1,0)$ to perform the one-time reading operation related to the corresponding first bit of each multi-level cell;
setting reading voltages to be between $Vt(1,1,1)$ and $Vt(1,0,1)$, between $Vt(1,0,0)$ and $Vt(1,1,0)$, and between $Vt(0,1,1)$ and $Vt(0,0,1)$ respectively to perform the M reading operations related to the corresponding second bit of each multi-level cell; and
setting reading voltages to be between $Vt(1,0,1)$ and $Vt(1,0,0)$, between $Vt(0,1,0)$ and $Vt(0,1,1)$, and between $Vt(0,0,1)$ and $Vt(0,0,0)$ respectively to perform the N reading operations related to the corresponding third bit of each multi-level cell.

13. The data accessing method according to claim 10, further comprising:
setting a first threshold value, wherein the first threshold value is less than a maximum number of correctable bits of an error correction code;
checking whether the normal data has at least one error bit, and calculating a number of error bits in the normal data;
comparing the number of the error bits in the normal data with the first threshold value;
if the number of the error bits is greater than the first threshold value, reading the weight data from the plurality of first bits of the multi-level cells and reading the normal data from the plurality of second bits and the plurality of third bits of the multi-level cells;
correcting the at least one error bit of the normal data by the error correction code and updating the weight data; and
writing the updated weight data to the plurality of first bits of the multi-level cells and writing the corrected normal data to the plurality of second bits and the plurality of third bits of the multi-level cells.

14. The data accessing method according to claim 10, wherein each cell of the plurality of multi-level cells is a quad-level cell storing four bits of data and is further configured to store a corresponding fourth bit of a plurality of fourth bits in a fourth page, and the data accessing method further comprises:

reading the plurality of fourth bits according to P reading operations related to the corresponding fourth bit of each of the multi-level cells, wherein a magnitude of a difference between each of P and M, P and N, and M and N is less than or equal to 1.

15. The data accessing method according to claim 14, wherein the four bits of data of each of the quad-level cells are $(1\ 1\ 1\ 1)_2$, $(1\ 1\ 1\ 0)_2$, $(1\ 1\ 0\ 0)_2$, $(1\ 0\ 0\ 0)_2$, $(1\ 0\ 1\ 0)_2$, $(1\ 0\ 1\ 1)_2$, $(1\ 0\ 0\ 1)_2$, $(1\ 1\ 0\ 1)_2$, $(0\ 1\ 0\ 1)_2$, $(0\ 0\ 0\ 1)_2$, $(0\ 0\ 0\ 0)_2$, $(0\ 0\ 1\ 0)_2$, $(0\ 0\ 1\ 1)_2$, $(0\ 1\ 1\ 1)_2$, $(0\ 1\ 1\ 0)_2$ or $(0\ 1\ 0\ 0)_2$ respectively corresponding to a plurality of threshold voltage distributions Vt(1,1,1,1), Vt(1,1,1,0), Vt(1,1,0,0), Vt(1,0,0,0), Vt(1,0,1,0), Vt(1,0,1,1), Vt(1,0,0,1), Vt(1,1,0,1), Vt(0,1,0,1), Vt(0,0,0,1), Vt(0,0,0,0), Vt(0,0,1,0), Vt(0,0,1,1), Vt(0,1,1,1), Vt(0,1,1,0) and Vt(0,1,0,0), and the threshold voltage distributions Vt(1,1,1,1), Vt(1,1,1,0), Vt(1,1,0,0), Vt(1,0,0,0), Vt(1,0,1,0), Vt(1,0,1,1), Vt(1,0,0,1), Vt(1,1,0,1), Vt(0,1,0,1), Vt(0,0,0,1), Vt(0,0,0,0), Vt(0,0,1,0), Vt(0,0,1,1), Vt(0,1,1,1), Vt(0,1,1,0) and Vt(0,1,0,0) are arranged in an order from low voltage to high voltage.

16. The data accessing method according to claim 15, wherein M=4, N=5, P=5, and the data accessing method further comprises:

setting a reading voltage to be between Vt(1,1,0,1) and Vt(0,1,0,1) to perform the one-time reading operation related to the corresponding first bit of each of the multi-level cells;

setting reading voltages to be between Vt(1,1,0,0) and Vt(1,0,0,0), between Vt(1,0,0,1) and Vt(1,1,0,1), between Vt(0,1,0,1) and Vt(0,0,0,1), and between Vt(0,0,1,1) and Vt(0,1,1,1) respectively to perform the M reading operations related to the corresponding second bit of each of the multi-level cells;

setting reading voltages to be between Vt(1,1,1,0) and Vt(1,1,0,0), between Vt(1,0,0,0) and Vt(1,0,1,0), between Vt(1,0,1,1) and Vt(1,0,0,1), between Vt(0,0,0,0) and Vt (0,0,1,0), and between Vt(0,1,1,0) and Vt(0,1,0,0) respectively to perform the N reading operations related to the corresponding third bit of each of the multi-level cells; and setting reading voltages to be between Vt(1,1,1,1) and Vt(1,1,1,0), between Vt(1,0,1,0) and Vt(1,0,1,1), between Vt(0,0,0,1) and Vt(0,0,0,0), between Vt(0,0,1,0) and Vt (0,0,1,1) and between Vt(0,1,1,1) and Vt(0,1,1,0) respectively to perform the P reading operations related to the corresponding fourth bit of each of the multi-level cells.

* * * * *